United States Patent [19]

Boetto

[11] 4,418,763
[45] Dec. 6, 1983

[54] AGRICULTURAL FOLDING TOOL BAR

[75] Inventor: Charles Boetto, Naperville, Ill.

[73] Assignee: International Harvester Co., Chicago, Ill.

[21] Appl. No.: 307,394

[22] Filed: Oct. 1, 1981

[51] Int. Cl.³ .............................................. A01B 73/00
[52] U.S. Cl. ..................................... 172/776; 172/311; 172/456
[58] Field of Search .............. 172/311, 126, 446, 456, 172/662, 666, 776, 266

[56] References Cited

U.S. PATENT DOCUMENTS

| 4,030,551 | 6/1977 | Boetto et al. | 172/456 X |
| 4,046,203 | 9/1977 | Ward | 172/456 |
| 4,074,766 | 2/1978 | Orthman | 172/311 |
| 4,236,583 | 12/1980 | Geurts | 172/226 |
| 4,281,720 | 8/1981 | Tusing | 172/446 X |
| 4,336,846 | 6/1982 | Boetto | 172/776 |
| 4,342,367 | 8/1982 | Gates | 172/776 |

OTHER PUBLICATIONS

Cramer, "Favorit-S, Saatbett Kombination", Maschinenfabrik Cramer, Ostfriesland, Germany, Sep. 1974.

Primary Examiner—Richard T. Stouffer
Assistant Examiner—William H. Honaker
Attorney, Agent, or Firm—Dennis K. Sullivan; F. David AuBuchon

[57] ABSTRACT

A tool bar having a hollow central section and oppositely extending offset hinged wings movable from a generally horizontal, transversely extending working position to a folded transport position. A hydraulic cylinder is positioned in the central section adjacent each wing and has its rod end pivotally connected to a pair of sliders below their center position for an effective lever action about the offset hinge with the sliders substantially spanning the hollow central section. The rod end is also pivotally connected to a pair of links via a slotted connection, with the links also being pivotally connected to the ear of a wing. The sliders reduce wing fall as the cylinder moves the wing from the working position approximately 180° to a transport position on top of the central section or vice versa. The slotted link connection prevents binding of the sliders against the central section during the procedures.

8 Claims, 8 Drawing Figures

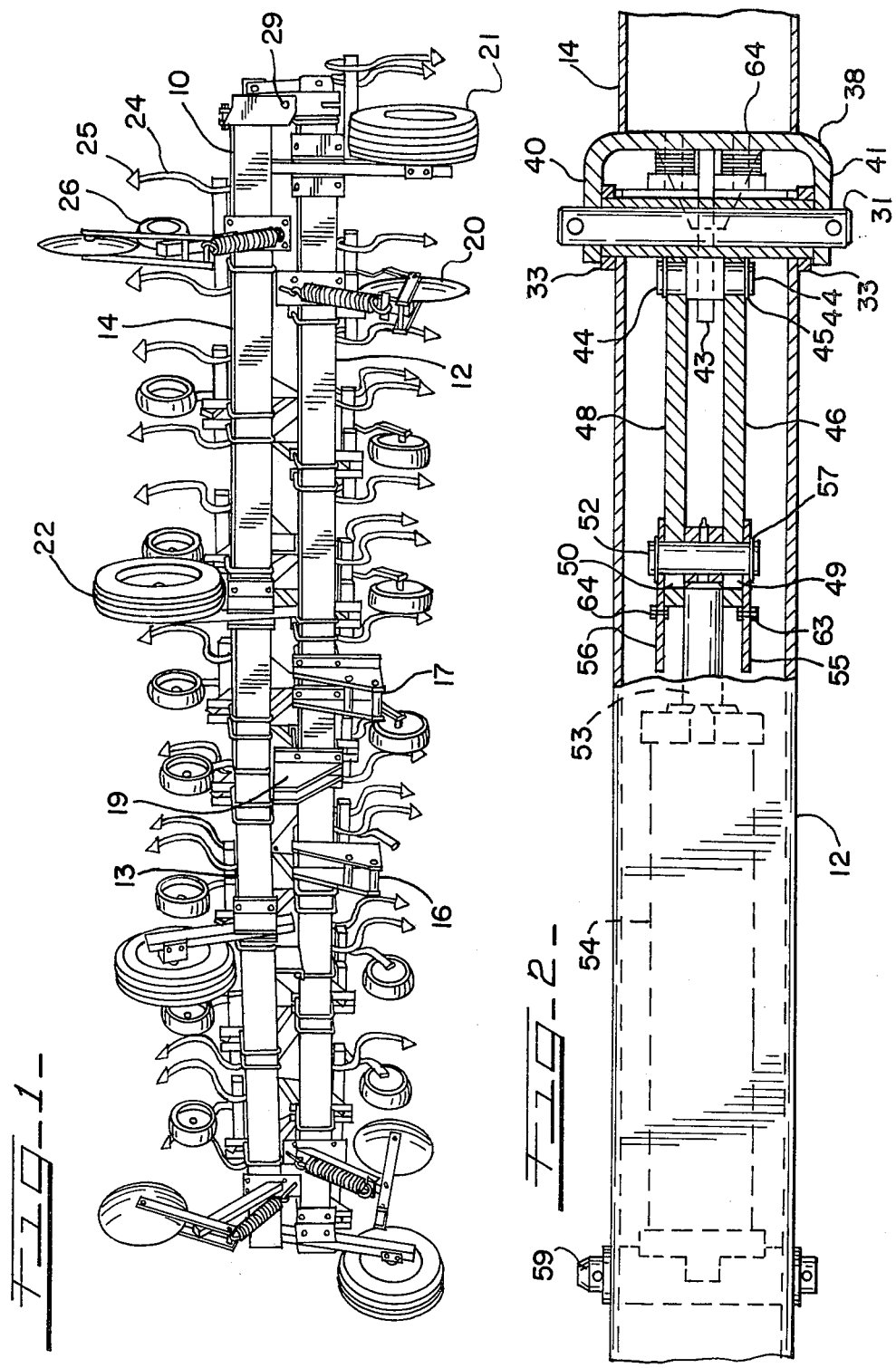

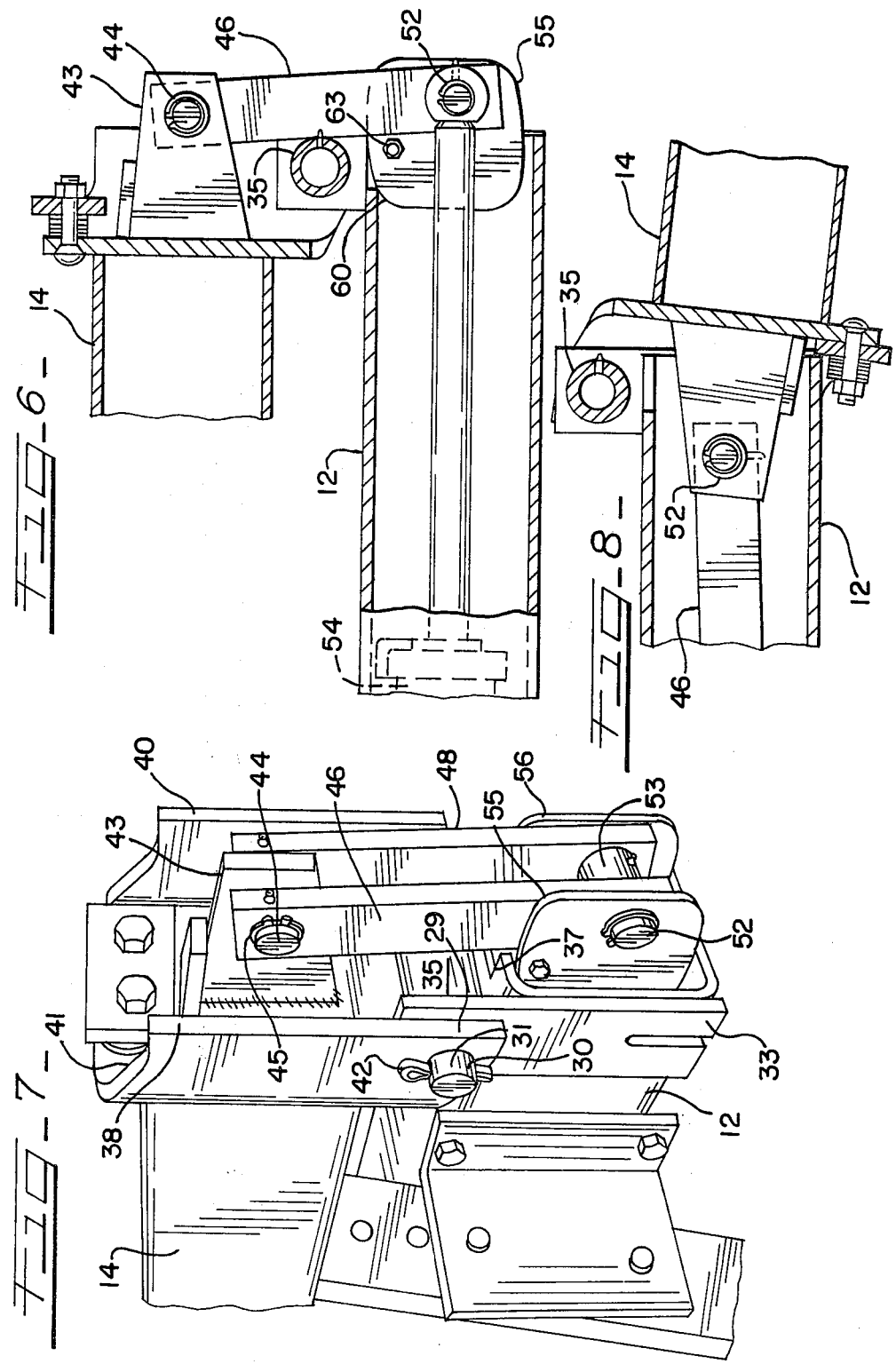

AGRICULTURAL FOLDING TOOL BAR

BACKGROUND OF THE INVENTION

1. Field of the Invention

This invention pertains generally to agricultural tool bars.

2. Description of the Prior Art

In tool bars having wings that are foldable from an extended transverse ground working position to a narrow transport position, it has become common to install the hydraulic cylinder for each wing inside the hollow tool bar to avoid tool conflict. Where a tool bar wing is to be folded more than 90°, rollers are required to support the rod end of each cylinder and an extra link or links between the rod end and an ear on the tool bar wing is required. By careful sizing of the rollers in the tool bar and a lost motion connection, preferably between the link and the rod end, wing fall can be substantially reduced while providing a smooth folding capacity of about 180° so that the folded wing lies on the tool bar central section.

A problem, however, occurs when a heavy large wing is to be folded and unfolded because of the limited length possible of the link in the tool bar. Especially in the unfolding process wherein the upper hinge pivot between wing and central section is used as a fulcrum, the effective lever length of the link to the rod end is small and hence higher hydraulic pressure may be necessary than is normally provided by the tractor. Also, when the cylinder rod is extended as the wing is initially lifted, a greater level action is desirable.

SUMMARY OF THE INVENTION

Applicant, as a consequence, designed a folding tool bar that retains the advantages of the prior art while eliminating the need for higher hydraulic pressure. Specifically, Applicant provides longer links by connecting the rod end of the cylinder to preferably a pair of spaced sliders below their center point. Thus, the effective lever length of the link or links therefrom to the unholding fulcrum is increased. Standard tractor hydraulic pressure can be utilized to lift the wing upon extension of the cylinder rod, and also to unfold the wing from the transport position. No rollers can be utilized; thus, non-rotating, sliders, as the sliders must not move 180° about the connection to the rod especially as it moves near the end of the central section, are used. A fastener attached to each slider when contacted by the adjacent link prevents this situation so the sliders can be withdrawn properly into the central section when the cylinder is retracted as the wing moves to the operating or working position. Also, the sliders preferably have a cam upper surface to engage the central section upper surface to aid in the re-entry of the sliders into the central section. As with the rollers of the prior art, the sliders must also be carefully sized to the interior of the central section and, to further prevent chatter and binding therein, a lost motion slitted connection is utilized between the links and the cylinder rod.

It is therefore, an object of this invention to provide a new and improved folding tool bar.

Another object of this invention is to provide a tool bar that folds approximately 180°.

Another object of this invention is to provide a tool bar that has high lift capacity with normally available hydraulic pressure.

BRIEF DESCRIPTION OF THE DRAWINGS

FIG. 1 is a perspective front view of the tool bar in the folded transport position;

FIG. 2 is an enlarged plan view, partially in section, of a portion of the tool bar in the working position;

FIG. 6 is a view with the wing in the approximately 180° transport position;

FIG. 7 is an enlarged perspective front view of a tool bar portion in the transport position; and FIG. 8 is a view of the tool bar similar to FIG. 3 for flex operation.

BRIEF DESCRIPTION OF THE PREFERRED EMBODIMENT

Figure 3:
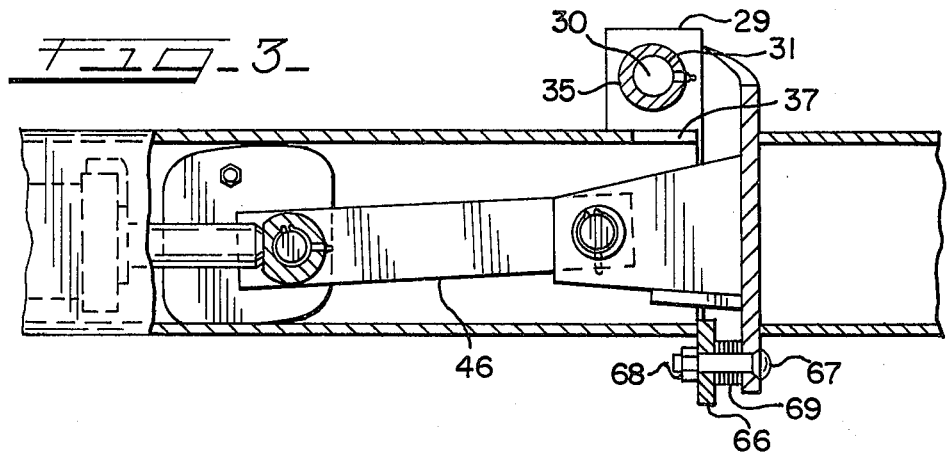
FIG. 3 is a front view, partially in section, of the tool bar portion of FIG. 2 showing non-flex operation.
Figure 4:
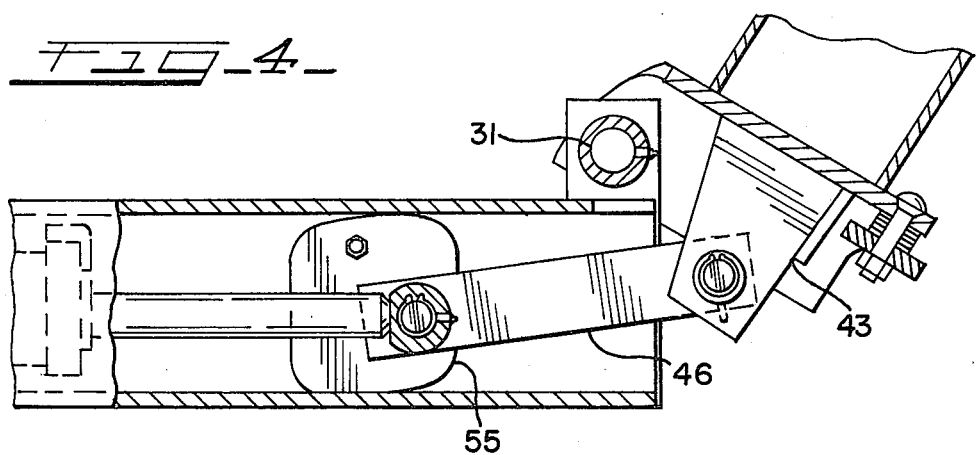
FIG. 4 is a view similar to FIG. 3 with the wing lifted 60°.
Figure 5:
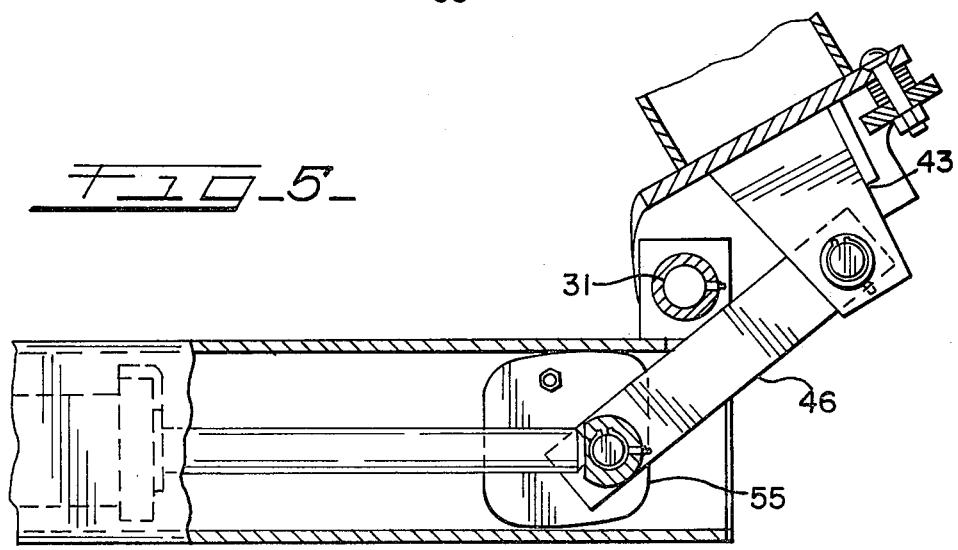
FIG. 5 is a view with the wing lifted 120°.

Referring to FIG. 1, 10 indicates an agricultural folding tool bar. Tool bar 10 includes a central section 12, a right wing section 13 (when standing to the rear of the tool bar and looking forward) pivoting mounted to the center section, and a left wing section 14 similarly mounted. The tool bar 10 has the usual spaced lower brackets 16 and 17 for a tractor three point hitch with upper bracket 19 provided for the compression and tension link. Spring loaded guide fins 20 are utilized to prevent wandering at high speeds on the central section 12 and the wings. Carrying wheels 21 are generally used on large tool bars and are located adjacent the ends of the central section 12. Likewise a carrying wheel 22 may be utilized for each wing.

Tool bar 10, as shown, is equipped for cultivator operation with spaced gangs 24 of adjustable spaced spring loaded shanks 25 having sweeps. Each gang is connected to the tool bar by a parallel bar linkage supported by an adjustable gauge wheel 26 for uniform depth cultivation. For a more complete understanding of gang 24, U.S. Pat. No. 3,921,726 granted Nov. 25, 1975 for CULTIVATOR HAVING PLURALITY OF LATERALLY ADJUSTABLE TOOL-SUPPORTING BEAMS should be consulted. Obviously, other earth-working tools could be utilized with tool bar 10.

The tool bar folded transport position is shown in FIG. 1. Since both wings and the folding structure are identical, only left wing 14 and the associated central section of the tool bar 12 will be discussed. Thus, referring to FIG. 1, enlarged FIG. 7, and FIGS. 2 through 8, central section 12 is pivotally connected to left wing 14 by hinge 29 about offset axis 30 defined by shaft 31. Hinge 29 includes spaced plates 33 welded to each lateral side of central section 12 and extending above same. Sleeve 35 extends between and through plates 33 above section 12 and is welded thereto to provide a bearing for shaft 31. Sleeve 35 may have a conventional lubrication fitting for shaft 31 rotatable therein. Sleeve 35 also provides a fulcrum for the later to be described links because of cut out portion 37 in the upper wall of central section 12. Bracket 38 is welded to the open end of wing 14 and closes same forming an open channel having spaced walls 40 and 41 which encloses plates 33. Shaft 31 extends outward of sleeve 35 and via suitable apertures extends through the channel walls. Via a cotter pin 42 at one end and a locking pin extending between the other end of the shaft 31 and wall 41, shaft 31 is releasably mounted in hinge 29 and rotates with wing 14.

Also, a part of wing 14 and rigidly mounted on the central portion of 38 and midway between walls 40 and 41 is bar 43. Bar 43 has shaft 44 rigid therewith and extending on both sides thereof. Bar 43 and shaft 44 constitute a wing ear and extend into the interior of central section 12 when wing 14 is in the working position. Shaft 44 provides a pivotal mounting for longitudinal links 46 and 48 (each of which is located on an opposing surface of bar 43 by snap rings 45 extending into suitable grooves in shaft 44. Suitable lubrication fittings may be provided in links 46 and 48 for shaft 44 as well as for shaft 31.

Links 46 and 48 are pivotally connected via axially slotted holes 49 and 50 respectively with a clearance of 13 mm for 32.5 mm shaft 52 extending therethrough and also through an opening through the rod end 53 of double acting hydraulic cylinder 54. Also, pivotally connected to shaft 52 are sliders 55 and 56 with slider 55 being located adjacent link 46 and slider 56 being located adjacent link 48. Snap rings 57 releasably maintain the elements on shaft 52. A suitable lubrication fitting may be provided in the rod end 53 for shaft 52. Cylinder 54, at the end remote from rod end 53, is pivotably mounted inside section 12 by shaft 59 extending through the side walls of section 12 and maintained therein by suitable washers and cotter pins.

Sliders 55 and 56 have an aperture as shown best in FIG. 6 for shaft 52 which is located below the center of the elements. As a consequence, the effective length of the pivot axis 30 of shaft 31 in sleeve 35 or fulcrum (which is unchanged in position as is shaft 44) to shaft 52 is longer than if 52 were located in the center of the sliders. Hence, an increased effective lever arm is provided particularly in FIG. 6 when the wing is to be extended. The effective lever length is also larger in FIG. 3. Sliders 55 and 56 also have cam surfaces 60 and 61 (not shown) which as shown in FIG. 6 engage the upper wall of central section to insure return of the sliders to the interior of central section. Sliders 55 and 56 are also sized to substantially span the upper and lower walls of central section 12 being 154 mm compared to 158.75 mm of section 12.

Also, from a comparison of FIGS. 2 and 6 fasteners 63 and 64 located in sliders 55 and 56 respectively will engage links 46 and 48 if necessary to prevent the pivoting of the sliders about shaft 52 as they move outwardly from central section 12. This ensures the sliders will remain in the same rotatable position of FIGS. 3 through 5.

Also, shown, in FIGS. 3 and 8 is a provision for non-flex or flex operation. For this purpose, applicant provides block 66 that is releasably attached to bracket 38 between walls 40 and 41 below bar 43 by spaced bolts and nuts 67 and 68. A plurality of washers 69 by their mounting position on the bolts alternately place one side of block 66 against the lower wall of central section 12 for a substantially horizontally aligned central section and wing and another side for a downwardly extending wing position. In the horizontally aligned position of FIG. 3, with the cylinder rod retracted but short of the fully retracted position, the block and therefore the wing is held rigidly against the central section with the clearance of the links slotted holes being taken up by the remaining stroke of the cylinder. Thus, the wing cannot flex up or down in working. Reversing the washers (see FIG. 8) and with the cylinder rod retracted the cylinder brings the other side of the block 66 into contact against the lower wall of section 12 with the wing inclined downwardly. The clearance of the link slotted holes is also eliminated. If a conventional valve is moved to the open center position, the wing can flex or float upwardly an unlimited amount as the wing wheel follows the ground contour and downwardly until the other side of the block contacts the central section by pumping the cylinder.

In operation, and as shown best in FIG. 3, wherein the tool bar is extended for non-flex operation, as the cylinder rod of cylinder 54 is extended to fold wing 14, the clearance in slots 49 and 50 of links 46 and 48 is initially removed. The rod then via the links then forces wing 14 upwardly via shaft 44. Due to the lower then central mounting of shaft 52 on sliders 55 and 56, the effective lever arm to pivot axis 30 is increased and wing 14 is lifted with reduced hydraulic pressure. Sliders 55 and 56 support the rod to the 60° rotation of FIG. 4. As the wing continues to fold upwardly, the sliders contact the upper wall of central section 12, and as the wing passes over center the slots 49 and 50 are utilized to prevent binding of the sliders and the links encounter the fulcrum of sleeve 35. At the end of the rod extension the sliders move partially out of central section 12 with cam surfaces 60 and 61 contacting the upper wall adjacent cut out portion 37. Fasteners 63 and 64 prevent the rotation of the sliders out of the central section 12. Wing 14 is then folded about 180° and rests on suitable brackets on top of central section 12 as shown in FIG. 1. The folding has been accomplished with control and little wing fall or binding of elements.

To move wing 14 from the folded position of FIG. 6, the rod of cylinder 54 is retracted. Cam surfaces 60 and 61 engage the upper wall of central section 12 and guide the sliders back into the section. The effective lever arm between the fulcrum at sleeve 35 is increased by the difference between the central position of the sliders to the actual lower position of the connection of shaft 52 therewith. In FIG. 6, the slots 49 and 50 are vertical and thus this clearance is not taken up allowing the wing to move to the position over the axis via the fulcrum without binding of the sliders against the upper wall of section 12. As the wing moves over center, the wing has a tendency to fall outwardly and would force the sliders tightly against the bottom of section 12. Here the axial slot clearance of the link relieves the binding and the closely sized sliders reduce wing fall as the wing moves to the working position of FIG. 3. As mentioned, the closely sized sliders to that of section 12 are also necessary to prevent chattering of the sliders and binding due to rotation of the sliders about shaft 52 during cylinder actuation.

What is claimed is:
1. A folding tool bar adapted to support ground working tools and comprising:
   (a) a normally horizontal, hollow central section;
   (b) an outer wing section pivotally connected to said central section about an offset axis for movement between a working position in general alignment with said central section and a folded transport position on said central section, said pivotal connection providing a fulcrum for a portion of said movement;
   (c) a hydraulic cylinder mounted in said central section;
   (d) a pair of spaced support means substantially spanning the interior of said central section and pivot- ally connected to the rod end of the cylinder, said connection being sufficiently below the center of said means to effectively increase the lever arm when the wing section is extended; and (e) a pair of links pivotally connected to said rod end by slotted openings, said wing having an ear, said ear being pivotally connected to said links, said links upon cylinder actuation, moving said wing upward until said wing passes inwardly over center of said axis and said links contact said fulcrum and pivot thereabout as the wing moves to the transport position, said support means relieving wing fall and said links slotted connection preventing support means binding in said central section in the movement between working and transport and vice versa.

2. The tool bar of claim 1 in which said central section has a cut out portion for said links in the transport position and each support means has a cam surface for engaging said central section adjacent said cutout portion.

3. The tool bar of claim 2 further comprising means for preventing the rotation of each support means about said rod end as said wing approaches the transport position.

4. The tool bar of claim 3 in which said rotation preventing means is mounted on each support means and is adapted to contact the adjacent link.

5. The tool bar of claim 2 in which each link is located adjacent an opposing side of said rod end and each support means is located adjacent a link.

6. The tool bar of claim 2 in which said links are elongated and said slotted openings extend axially in said links.

7. The tool bar of claim 6 in which said offset axis is located above said central section and said wing and forms a pivot for a hinge connecting said central connection and said wing.

8. The tool bar of claim 7 further comprising an adjustable stop on said wing section for contact with the lower wall of said central section to vary the inclination between the wing and central section in the working position.

* * * * *